United States Patent [19]

Haaf et al.

[11] 4,433,088

[45] Feb. 21, 1984

[54] POLYPHENYLENE ETHER COMPOSITIONS AND PROCESS

[75] Inventors: William R. Haaf, Voorheesville; James A. Huebner, Glenmont; Arthur Katchman, Delmar, all of N.Y.

[73] Assignee: General Electric Company, Pittsfield, Mass.

[21] Appl. No.: 382,078

[22] Filed: May 26, 1982

Related U.S. Application Data

[63] Continuation of Ser. No. 238,543, Feb. 26, 1981, abandoned.

[51] Int. Cl.[3] .................... C08K 5/51

[52] U.S. Cl. .................... 524/153; 524/151; 525/65; 525/66; 525/68; 525/76; 525/107; 525/109; 525/132; 525/139; 525/144; 525/396; 525/397

[58] Field of Search .................... 524/141, 151, 153; 525/227, 138, 65, 68, 107, 109, 122, 390, 396, 397

[56] References Cited

U.S. PATENT DOCUMENTS

| | | | |
|---|---|---|---|
| 3,219,626 | 11/1965 | Blanchard et al. | 260/47 |
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,337,499 | 8/1967 | Bussink et al. | 260/47 |
| 3,342,892 | 9/1967 | Laakso et al. | 260/823 |
| 3,344,166 | 9/1967 | Zinsstag | 260/465.2 |
| 3,356,761 | 12/1967 | Fox | 260/874 |
| 3,382,212 | 5/1968 | Price et al. | 260/47 |
| 3,383,435 | 5/1968 | Cizek | 260/874 |
| 3,384,619 | 5/1968 | Hori et al. | 260/47 |
| 3,440,217 | 4/1969 | Faurote et al. | 260/47 |
| 3,442,885 | 5/1969 | Wieden et al. | 260/47 |
| 3,455,880 | 7/1969 | Kobayashi | 260/47 |
| 3,573,257 | 3/1971 | Nakashio et al. | 260/47 |
| 3,737,479 | 6/1973 | Haaf | 260/824 R |
| 4,152,316 | 5/1979 | Cooper et al. | 525/68 |
| 4,153,644 | 5/1979 | Sugio et al. | 525/92 |
| 4,226,761 | 10/1980 | Cooper et al. | 260/45.9 NP |

FOREIGN PATENT DOCUMENTS 1291609 10/1972 United Kingdom .

OTHER PUBLICATIONS

Science, May 23, 1980, p. 817.

*Primary Examiner*—J. Ziegler
*Attorney, Agent, or Firm*—Hedman, Gibson, Costigan & Hoare

[57] ABSTRACT

Novel compositions are provided which comprise a polyphenylene ether, optionally a high impact polystyrene, optionally, an effective amount of an aromatic phosphate flame retardant, and a low molecular weight polymer selected from a polyolefin glycol or a polyamide, said composition being free from or excluding a substantial content of polyolefin, such as polyethylene. Such compositions when molded are readily paintable, and exhibit good adhesion between the paint and the molded compositions as distinguished from compositions containing polyolefins, such as polyethylene, which has been found to adversely affect paint adhesion. In addition, the novel compositions possess good or improved Izod and Gardner impact strengths, and in the case of polyolefin glycol, such as polyethylene glycol, the mutual solubility of all the components of the compositions is increased. Included within the disclosure of the invention are methods of preparing and molding such compositions and the molded products obtained therefrom.

15 Claims, No Drawings

POLYPHENYLENE ETHER COMPOSITIONS AND PROCESS

CROSS-REFERENCE TO RELATED APPLICATION

This is a continuation of application Ser. No. 238,543, filed Feb. 26, 1981, abandoned.

STATEMENT OF THE INVENTION

This invention relates to compositions which comprise a polyphenylene ether, also known as polyphenylene oxide (PPO), high impact polystyrene (HIPS) and an aromatic phosphate flame retardant, and a low molecular weight polymer selected from a polyolefin glycol or a polyamide, said composition being free from or excluding a substantial content of any polyolefin, such as polyethylene. The compositions when molded are readily paintable, and exhibit a high level of adhesion between the paint and the molded composition, as distinguished from compositions containing polyolefins, such as polyethylene as a mold release agent which has been found to adversely affect paint adhesion. In addition, there is no loss of mold-release properties, that is, parts molded from the novel compositions do not resist ejection from the mold during injection-molding, as is the case with compositions that do not contain any of the aforesaid polymers, from which polyethylene has been removed.

In addition, the novel compositions possess good or improved Izod and Gardner impact strength, and in case of the polyolefin glycol polymer, such as polyethylene glycol, the mutual solubility of the components of the compositions are increased; there is increased resistance to environmental stress and there is reduction in the phenomenon known as juicing. In addition to providing the aforesaid properties to PPO/HIPS blends flame retarded with aromatic phosphates, the addition of polyethylene glycol polymers increase the solvent resistance of the blends, besides serving as compatibilizers and providing improved blend homogeneity.

The invention also relates to methods of preparing and molding the novel compositions and the molded products obtained therefrom.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds are found in Fox, U.S. Pat. No. 3,356,761; Sumitomo, U.K. Pat. No. 1,291,609; Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,445,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al U.S. Pat. No. 3,382,212. Cizek, U.S. Pat. No. 3,383,435 discloses polyphenylene etherstyrene resin compositions. All of the above-mentioned disclosures are incorporated by reference.

The term "polystyrene resin" includes polymers and copolymers of styrene, alpha methyl styrene, chlorostyrene, and the like, and also high-impact polystyrene, also known in the art as HIPS, see Science, p. 817 Vol. 208, May 23, 1980, which is a rubber modified polystyrene.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers are improved.

Rubber modified high impact polystyrenes are commercially available under the trade names Amoco 6H6, from the Amoco Company; FG-834 from the Foster Grant Co., and HT-91 from Monsanto Company. These, in general, are polystyrene modified with polybutadiene rubber. The preferred HIPS is Amoco 6H6.

In U.S. Pat. No. 3,737,479 it is disclosed that the addition of silicone oils to polyphenylene oxide or to polyphenylene oxide-polystyrene blends, preferably a rubber modified high impact polystyrene (See Example 1) improves Gardner impact strength but does not affect the Izod impact strength. It is stated, col. 6, lines 48 to 54 of the patent: "In a preferred embodiment of the invention, there is incorporated a polyolefin into the composition. This enhances Izod impact strengths and processability without reducing other properties. Suitable polyolefins include, polyethylene, polypropylene and ethylene-propylene copolymer and also polyisoprene, polyisobutylene, and the like." In Example 1 polyethylene is disclosed.

In U.S. Pat. No. 4,226,761 polyethylene is also included in the polyphenylene ether compositions.

While compositions comprising polyphenylene ether (PPO), high impact polystyrene (HIPS), aromatic phosphate flame retardant and polyethylene (PE) possess good physical properties, it has been found that they are difficult to paint in injection molded form, as a result of poor adhesion between lacquer-paint coatings and the PPO/HIPS/aromatic phosphate/PE substrate.

While paint adhesion may be improved simply by removal of the PE from the PPO/HIPS/aromatic phosphate/PE composition, or composite, such removal adversely affects mold release properties during injection-molding as well as impact performance.

It has now been found that if the PE is replaced by a low molecular weight polyamide or a low molecular weight polyolefin glycol, as for example polyethylene glycol or polypropylene glycol, paint adhesion is significantly improved with no loss of mold-release properties, that is, the molded parts do not resist ejection from the mold during injection molding. The novel compositions possess good or improved Izod and Gardner impact strength, and in cases where the polyolefin glycol polymer replaces the polyethylene, the mutual solubility of components of the compositions is increased, with an increased resistance to environmental stress and reduction in the phenomenon known as juicing. Besides serving as a compatibilizer and providing improved blend homogeneity, the polyolefin glycol polymers increase the solvent resistance of the novel compositions.

DESCRIPTION OF THE INVENTION

The above mentioned advantages and objects and others will be readily apparent to those skilled in the art by the following compositions. Preferred types will include thermoplastic compositions which comprise, (the parts being by weight):

(a) from about 20 parts to about 80 parts of polyphenylene ether resin (PPO), and (b) from about 0 parts to about 80 parts of a high impact polystyrene (HIPS) resin, and (c) from about 0 parts to about 25 parts of an aromatic phosphate flame retardant, and (d) from about 0.1 parts to about 5 parts of a low molecular weight polymer selected from a polyolefin glycol or a polyamide, said composition being free of or excluding a substantial content of a polyolefin, such as polyethylene.

The compositions may also contain pigments such as titanium dioxide, carbon black, and pigment colors such as Krolar yellow 908 and Krolar orange 909 which are the trademarks for pigments sold by duPont Company.

The high impact polystyrene (HIPS) is produced by dissolving a rubber in styrene monomer, which is then polymerized, for example by polymerizing styrene monomer in the presence of a polybutadiene rubber.

The polystyrene resin should have at least 25% of its units derived from styrene monomer of the formula:

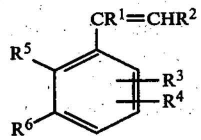

wherein $R^1$ and $R^2$ are selected from the group consisting of hydrogen and lower alkyl groups of from 1 to 6 carbon atoms; $R^3$ and $R^4$ are selected from the group consisting of chloro, bromo, hydrogen, and lower alkyl groups of from 1 to 6 carton atoms; and $R^5$ and $R^6$ are selected from the group from 1 to 6 carbon atoms, and halogen, or $R^5$ and $R^6$ may be concatenated together with hydrocarbyl groups to form a naphthyl group.

Specific examples of styrene monomers include styrene, bromostyrene, chlorostyrene, and $\alpha$-methylstyrene.

The polystyrene resins include by way of example, homopolymers, such as homopolystyrene and monochloropolystyrene and styrene-containing copolymers, such as styrene-chlorostyrene copolymers, styrene-bromostyrene copolymers, and $\alpha$-alkyl styrene copolymers.

The preferred polyphenylene ethers are of the formula:

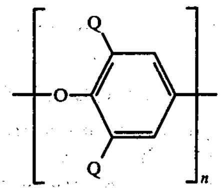

wherein the oxygen ether atom of one unit is connected to the benzene nucleus of the next adjoining unit, n is a positive integer and is at least 50, and each Q is a monovalent substitutent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene)ether. The intrinsic viscosity of the polyphenylene ethers can range from about 0.37 to 0.65 dl./g. measured in $CHCl_3$ at 30° C.

By polyamide is meant a condensation product which contains recurring aromatic and/or aliphatic amide groups as integral parts of the main polymer chain, such products being known generically as "nylons". These may be obtained by polymerizing a monoaminomonocarboxylic acid or an internal lactam thereof having at least two carbon atoms between the amino and carboxylic acid groups or by polymerizing substantially equimolar proportions of a diamine which contains at least two carbon atoms between the amino groups and a dicarboxylic acid; or by polymerizing a monoaminocarboxylic acid or an internal lactam thereof as defined above together with substantially equimolecular proportions of a diamine and a dicarboxylic acid. The dicarboxylic acid may be used in the form of a functional derivative thereof, for example an ester.

The term "substantially equimolecular proportions" (of the diamine and of the dicarboxylic acid) is used to cover both strict equimolecular proportions and the slight departures therefrom which are involved in conventional techniques for stabilizing the viscosity of the resultant polyamides.

As examples of the said monoaminomocarboxylic acids or lactams thereof there may be mentioned those compounds containing from 2 to 16 carbon atoms between the amino and carboxylic acid groups, said carbon atoms forming a ring with the -CO.NH-group in the case of a lactam. As particular examples of aminocarboxylic acids and lactams there may be mentioned $\epsilon$-aminocaproic acid, butyrolactam, pivalolactam, caprolactam, capryl-lactam, enantholactam, undecanolactam, dodecanolactam and 3- and 4-amino benzoic acids.

Examples of the said diamines are diamines of the general formula $H_2N(CH_2)_nNH_2$ wherein n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g., 2,2-dimethylpentamethylenediamine and 2,2,4- and 2,4,4-trimethylhexamethylenediamine, are further examples. Other diamines which may be mentioned as examples are aromatic diamines, e.g., p-phenylenediamine, 4,4'-diaminodiphenyl sulphone, 4,4'-diaminodiphenyl ether and 4,4'-diaminodiphenyl sulphone, 4,4'-diaminodiphenyl ether and 4,4'-diaminodiphenylmethane; and cycloaliphatic diamines, for example diaminodiccyclohexylmethane.

The said dicarboxylic acids may be aromatic, for example isophthalic and terephthalic acids. Preferred dicarboxylic acids are of the formula HOOC.Y.COOH wherein Y represents a divalent aliphatic radicals containing at least 2 carbon atoms, and examples of such acids are sebacic acid, octadecanedioc acid, suberic acid, azelacic acid, undecanedioic acid, glutaric acid, pimelic acid, and especially adipic acid. Oxalic acid is also a preferred acid.

Specifically the following polyamides may be incorporated in the thermoplastic polymer blends of the invention:

polyhexamethylene adipamide (nylon 6:6)
polypyrrolidone (nylon 4)
polycaprolactam (nylon 6)
polyheptolactam (nylon 7)
polycaprylactam (nylon 8)
polynonanolactam (nylon 9)
polyundecanolactam (nylon 11)
polydodecanolactam (nylon 12)
polyhexamethylene azelaiamide (nylon 6:9)
polyhexamethylene sebacamide (nylon 6:10)
polyhexamethylene isophthalamide (nylon 6:iP)
polymetaxylylene adipamide (nylon MXD:6)
polyamide of hexamethylenediamine and n-dodecanedioic acid (nylon 6:12)
polyamide of dodecamethylenediamine and n-dodecanedioic acid (nylon 12:12)

Nylon copolymers may also be used, for example copolymers of the following:

hexamethylene adipamide/caprolactam (nylon 6:6/6)
hexamethylene adipamide/hexamethylene-isophthalimide (nylon 6:6/6ip)
hexamethylene adipamide/hexamethylene-terephthalamide (nylon 6:6/6T)
trimethylehexamethylene oxamide/hexamethylene oxamide amine (nylon trimethyl-6:2/6:2)
hexamethylene adipamide/hexamethylene-azelaiamide (nylon 6:6/6:9)
hexamethylene adipamide/hexamethylene-azelaiamide/caprolactam (nylon 6:6/6:9/6)

Also useful is nylon 6:3 produced by Dynamit Nobel. This polyamide is the product of the dimethyl ester of terephthalic acid and a mixture of isomeric trimethyl hexamethylenediamine. Another useful nylon is DuPont's Zytel ST which is a nylon-based alloy.

The average molecular weight of the polyamides used in the invention ranges from about 1,000 to about 10,000.

A preferred polyamide is Unirez 2621 D grade, which is composed of amides of dimerized tall-oil fatty acids, chiefly oleic and linoleic acids. This polyamide is available from the Union Camp Company.

The polyglycols useful in the instant invention can range in molecular weight from about 150 to about 25,000. Polyethylene glycol having a molecular weight of 6000 is preferred. Also highly effective is polypropylene glycol having a molecular weight of 4000.

Examples of aromatic, and/or alkylaromatic phosphate flame retardants which also serve as plasticizers are triaryl phosphates and isopropylated triaryl phosphates such as triphenyl phosphate and isopropylated triphenylphosphate. They are employed in an amount ranging from about 2 parts to about 20 parts by weight and in general any amount effective to render the composition flame retarded. The preferred phosphate is triphenyl phosphate. Especially preferred is a composition comprised of mixed triaryl phosphates with one or more isopropyl groups on some or all of the aryl rings, such as Kronitex 50 supplied by Food Machinery Corporation.

The compositions of the invention can be formed by intimately mixing the components to form a premix, and then passing the premix through an extruder, such as a Werner-Pfleiderer twin screw-extruder at an elevated temperature of from about 450° F. to about 600° F. The extrudate can then be molded into any desired shape, as for example, by injection molding in an injection molding machine, such as a Newbury injection molding machine at a temperature ranging from about 450° F. to about 600° F. The compositions can be used to make molded parts, such as automotive cowl-vent grilles and cabinetry of various kinds, such as radio and television cabinetry, and other molded articles where it is desired to enhance the surface appearance by painting. The products molded from the novel compositions of the instant invention possess a high level of paint-to-plastic adhesion, especially for acrylic lacquer paints, as distinguished from compositions containing polyolefins, such as polyethylene.

DESCRIPTION OF THE PREFERRED EMBODIMENTS

The following examples are set forth as further illustration of the invention and are not to be construed as limiting the invention. The parts are by weight.

EXAMPLES 1–5

Forty parts of poly(2,6-dimethyl-1,4-phenylene) ether (PPO) with an intrinsic viscosity of 0.49 dl/gm as measured in chloroform at 30° C., 60 parts high impact polystyrene (Amoco 6H6 HIPS), 13 parts of isopropylated triphenyl phosphate (FMC Kronitex 50), 1.5 parts of low-molecular weight polyamide (Union Camp Unirez 2621D grade), 0.5 parts of decyldiphenylphosphite, 0.15 parts of zinc sulfide, 0.15 parts of zinc oxide, and the following pigments; 0.5 parts of titanium dioxide, 0.18 parts of carbon black, 0.6 parts of Krolar yellow 908, and 1.0 parts of Krolar orange 909 were mixed and extruded on a 28 mm Werner-Pfleiderer twin screw extruder set at 500° F. with 5 in. mercury vent vacuum. Moldings were obtained using a 4 oz. Newbury injection molding machine at 460° F.

For comparison similar compositions were made: one, without either of the low-molecular weight polyamide, polyethylene, or low-molecular weight polyolefin glycol, and three with a composition containing polyethylene (AC6 grade of polyethylene obtainable from Allied Chemical Company) in the amounts of 0.5, 1.0 and 1.5 parts. These compositions as well as the composition containing the low molecular weight polyamide, and their properties are listed in Table 1 which follows.

TABLE 1

| EXAMPLES | pbw Modifier | FC(1) | ⅛" UL94(2) | Izod(3) | Paint Adhesion(4) |
|---|---|---|---|---|---|
| 1 | None | 20¾ | 4.3, V-0 | 2.8 | 5, 4½ |
| 2 | 0.5 polyethylene | 20¼ | 4.5, V-0 | 2.8 | 4½, 4 |
| 3 | 1.0 polyethylene | 19¾ | 4.1, V-0 | 2.6 | 5, 4, 3 |
| 4 | 1.5 polyethylene | 20 | 4.1, V-0 | 2.8 | 1, 2, 2 |
| 5 | 1.5 low-MW polyamide | 20 | 4.3, V-0 | 2.4 | 4½, 5 |

Notes:
(1)Flow channel length (inches) molded at 10,000 psi.
(2)The average self-extinguishing time for five ⅛" × ½" × 2½" specimens (ten ignitions) when tested in accordance with Underwriters' Laboratories Bulletin 94 flammability test procedure.
(3)Average notched Izod impact strength (ft.-lbs./in.-notch) using five ⅛" × ½" × 2½" specimens (ASTM D 256 procedures).
(4)A given 3¾" × 2½" × ⅛" specimen was spray-painted with Bee Chemicals' black SF444 acrylic-base lacquer thinned with their T226 Thinner (primarily methanol and acetone). After drying, the painted surface was cross-hatched with a knife, then pull-tested with Scotch 610 adhesive tape. If the tape was paint-free, the specimen was rated "5" (or free of adhesion defects); If a great deal of paint adhered to the tape, the specimen was rated "0" (or very poor). Numbers from 0 to 5 describe various degrees of paint/substrate adhesion. The quality scale ranges from "0" (worst) to "5" (best) in accordance with ASTM-D3359.

The data in Table 1 show that:

(1) Good paint/plastic adhesion is obtained for compositions containing no PE or 1.5 pbw low-MW polyamide.

(2) The presence of PE adversely affects paint adhesion—even at levels as low as 0.5 pbw. (At ≦0.5 pbw, mold release is unsatisfactory).

(3) Physical properties of the composition containing low-MW polyamide are comparable to those of the PE composition.

EXAMPLES 6, 7, 8 AND 9

In these examples, each formation is as described in Examples 4 and 5 except that it was prepared or scaled-up in 250 lbs.-quantity using a 53 mm. Werner Pfleiderer extruder set at 500°-520° F. at 10 in. mercury vent vacuum. Moldings were obtained as in Examples 4 and 5. The properties are set forth in Tables 2A and 2B.

TABLE IIA

Physical Properties of Scaled-Up PPO/HIPS/Kronitex 50/Modifier Blends

| EXAMPLES | pbw Modifier | HDT | FC(1) | ⅛" UL94 | Izod | Gard(2) | 45° Gloss(3) |
|---|---|---|---|---|---|---|---|
| 6 | 1.5 polyethylene | 182 | 22¼ | 2.6, V-0 | 2.3 | 100 | 60.7 |
| 7 | 1.5 low-MW polyamide | 182 | 22¼ | 2.2, V-0 | 1.8 | 105 | 57.1 |

Notes:
(1)Heat-deflection temperature (°F.) under 264 psi fiber-stress using ⅛" × ½" × 2½" specimens (ASTM D 648 procedures).
(2)Gardner (drop-dart) impact resistance (in.-lbs.) determined according to the Bruceton Staircase method, using 10-15 3¾" × 2½" × ⅛" specimens.
(3)Surface gloss relative to an arbitrary standard (dimensionless)

TABLE IIB

Paintability and Mold-Release Properties of Scaled-UP PPO/HIPS/Kronitex 50/Modifier Blends

| EXAMPLES | pbw Modifier | Paint Adhesion(1) | No. of Mold-Release Defects(2) |
|---|---|---|---|
| 8 | 1.5 polyethylene | 3,3,2,1,1,0,0,1 | 11 |
| 9 | 1.5 low-MW polyamide | 5,5,5,5,5,5, 4½, 4½ | 8 |

Notes:
(1)Note (4) Table I applies except that, in this case, 8" × 6" × ⅛" specimens were used.
(2)A prototypic automotive cowl-vent grille was used to evaluate mold-release properties. Moldings were produced at 450° F. melt temperature, using a 450-ton Van Dorn machine. Stress-whitened sites on the surface of a given injection molding were evidence of poor release from the mold. The greater the number of these stress-whitened defects, the poorer was the mold-release capability of the plastic part.

The scaled-up data in Tables IIA and IIB show that:

(1) Good, consistent paint/plastic adhesion is obtained for the composition containing low-MW polyamide—much better than for the control containing PE.

(2) Mold-release properties of the polyamide composition are comparable to those of its PE counterpart.

(3) Again, physical properties of the polyamide composition are comparable to those of its PE counterpart.

EXAMPLES 10-19

In these examples the formulations are the same as in Examples 1-5 except that 1.5 parts of the specified polyolefin glycols specified in Table III, which follows, were employed instead of 1.5 parts of the low molecular weight polyamide. In the control (Example 10) 1.5 parts of polyethylene were employed. Each formulation was extruded and molded in the same manner and under the same conditions, and tested as in Tables I, IIA, and IIB. The number under the column "Modifier" indicates the molecular weight. Polyethylene glycols are available commercially from Union Carbide Corp. under the trademark Carbowax and from the Dow Chemical Company under the trademark Polyglycol E. Polypropylene glycols are available commercially from the Dow Chemical Company under the trademark Polyglycol P. The properties of the various compositions are set forth in Table III.

TABLE III

| EXAMPLES | Modifier | HDT | FC | Averaged ⅛" UL94 | Izod | Gardner | 45° Gloss | Paint Adhesion | No. of Mold Release Rejects |
|---|---|---|---|---|---|---|---|---|---|
| 10 | Polyethylene | 185 | 20¾ | 4.0, V-0 | 2.5 | 105 | 61.1 | 0, 1, 2 | — |
| 11 | Polyethylene glycol 200 | 174 | 20½ | 3.5, V-0 | 2.0 | 100 | 60.6 | 5, 5, 5 | — |
| 12 | Polyethylene glycol 400 | 174 | 21½ | 3.2, V-0 | 2.1 | 75 | 57.2 | 5, 5, 5 | — |

TABLE III-continued

| EXAMPLES | Modifier | HDT | FC | Averaged ⅛" UL94 | Izod | Gardner | 45° Gloss | Paint Adhesion | No. of Mold Release Rejects |
|---|---|---|---|---|---|---|---|---|---|
| 13 | Polyethylene glycol 600 | 173 | 21½ | 4.0, V-0 | 2.0 | 120 | 58.9 | 5, 5, 5 | — |
| 14 | Polyethylene glycol 1450 | 174 | 21½ | 2.9, V-0 | 2.1 | 130 | 56.7 | 5, 5, 5 | — |
| 15 | Polyethylene glycol 6000 | 186 | 20½ | 4.5, V-0 | 2.9 | 120 | 59.3 | 5, 5, 5 | — |
| 16 | Polyethylene glycol 8000 | 189 | 19½ | 3.3, V-0 | 3.2 | 75 | 60.5 | 5, 5, 5 | — |
| 17 | Polypropylene glycol 4000 | 178 | 21¼ | 5.2, V-1 | 2.0 | 105 | 59.1 | 5, 5, 5 | — |
| 18 | Polyethylene glycol 14,000 | 185 | 20 | 3.3, V-0 | 2.7 | 115 | 60.4 | 5, 5, 5 | — |
| 19 | Polyethylene glycol 20,000 | 187 | 20½ | 3.8, V-0 | 2.8 | 110 | 60.6 | 5, 5, 5 | — |

The data in Table III show that polyethylene glycol 6000 exhibits excellent paintability, superior mold release and equivalent impact strength as compared to the polyethylene control (Example 10). Also that polypropylene glycol 4000 exhibits excellent paintability and adequate impact. The other polyolefin glycols also exhibit excellent paintability, but may more or less vary in other properties.

Obviously, other modifications and variations of the present invention are possible. It has been observed that high molecular weight polyethylene oxide increases the Izod impact and Gardner impact strengths of compositions of polyphenylene ether resins and polystyrene resins, as compared to such compositions omitting the high molecular weight polyethylene oxide, the preferred polyethylene oxide having a molecular weight of 300,000. However, the paintability of the compositions did not approach that obtained with the low molecular weight polyamides and polyolefin glycols.

The above mentioned patents and/or publications are incorporated herein by reference. It is to be understood that changes may be made in the particular embodiments described above which are within the full intended scope of the invention as defined in the appended claims.

We claim:

1. A composition comprising:
(a) a polyphenylene ether resin,
(b) a high impact polystyrene,
(c) an aromatic phosphate flame retardant agent, and
(d) an effective amount of an adhesion promoting agent consisting essentially of a low molecular weight polyolefin glycol, said composition being free from polyethylene.

2. The composition of claim 1 wherein the aromatic phosphate is a triaryl phosphate or an isopropylated triarylphosphate.

3. The composition of claim 2 wherein the aromatic phosphate is triphenyl phosphate.

4. The composition of claim 2 wherein the aromatic phosphate is isopropylated triphenyl phosphate.

5. The composition of claim 1 wherein the polyolefin glycol has a molecular weight ranging from about 150 to about 25,000.

6. The composition of claim 5, wherein the polyolefin glycol is polyethylene glycol having a molecular weight of 6000.

7. The composition of claim 5 wherein the polyolefin glycol is polypropylene glycol having a molecular weight of 4000.

8. The composition of claim 1 wherein the polyphenylene ether resin is selected from compounds of the formula:

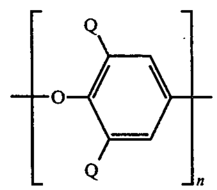

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

9. The composition of claim 1 wherein the high impact polystyrene is a rubber modified polystyrene.

10. The composition of claim 1 wherein the polyphenylene ether is poly(2,6-dimethyl-1,4-phenylene) ether.

11. The composition of claim 1, which comprises about 40 parts of poly(2,6-dimethyl-phenylene)ether, about 60 parts of high impact polystyrene, about 13 parts of isopropylated triphenyl phosphate, and about 1.5 parts of polyethylene glycol having a molecular weight of about 6000, the parts being by weight.

12. The composition of claim 1, which comprises about 40 parts of poly(2,6-dimethyl-phenylene)ether, about 60 parts of high impact polystyrene, about 13 parts of isopropylated triphenyl phosphate, and about 1.5 parts of polypropylene glycol having a molecular weight of about 4,000, the parts being by weight.

13. A molded composition having a high level of paint adhesion obtained by molding the composition of claim 1.

14. A process for preparing the composition of claim 1, which comprises intimately mixing (a), (b), (c), and (d) and blending the mixture.

15. A process according to claim 14 wherein the blended product is molded into a shaped article, the resulting molded article having a high level of paint adhesion.

* * * * *